July 27, 1954 R. T. COX 2,685,032

AUTOMATIC FREQUENCY CONTROL SYSTEM

Filed Sept. 21, 1950 2 Sheets-Sheet 1

INVENTOR.
ROBERT T. COX
BY Marvin Moody
Atty.

July 27, 1954
R. T. COX
2,685,032
AUTOMATIC FREQUENCY CONTROL SYSTEM
Filed Sept. 21, 1950
2 Sheets-Sheet 2

INVENTOR.
ROBERT T. COX
BY Morin Moody
ATTORNEY

Patented July 27, 1954

2,685,032

UNITED STATES PATENT OFFICE 2,685,032

AUTOMATIC FREQUENCY CONTROL SYSTEM

Robert T. Cox, Cedar Rapids, Iowa, assignor to Collins Radio Company, Cedar Rapids, Iowa, a corporation of Iowa Application September 21, 1950, Serial No. 186,037

5 Claims. (Cl. 250—36)

This invention relates in general to a means for maintaining frequency stability.

In order to best utilize the frequency spectrum in the transmission of radiant energy, particular frequencies have been allocated to various transmitters. Because of the large number of transmitters, the band width allocated to each one must of necessity be relatively narrow and it is imperative that they remain within this band. This requires that their output frequencies be maintained stable and accurate.

It is an object of this invention, therefore, to provide an automatic frequency control system which continually compares the output frequency of a master oscillator and maintains it at a predetermined point.

Another object of this invention is to provide an automatic frequency control circuit that compares the output of an oscillator with a frequency standard and prevents any error in the output of the oscillator.

Still another object of this invention is to provide means for tuning and maintaining an oscillator on a pre-determined frequency.

A feature of this invention is found in the provision for a tunable oscillator whose output is mixed with the output of a harmonic generator which has a multiplicity of equally spaced frequencies and a motor control circuit that compares the output of the mixer to a frequency standard. A motor tunes the variable oscillator until its output is identical with one of the spectrum lines of the harmonic generator.

Another feature of this invention is found in the provision for an automatic frequency control which has an interpolation oscillator that allows the master oscillator to be tuned to points between spectrum lines of the harmonic generator.

Further objects, features and advantages of this invention will become apparent from the following description and claims when read in view of the drawings, in which:

Figure 1:
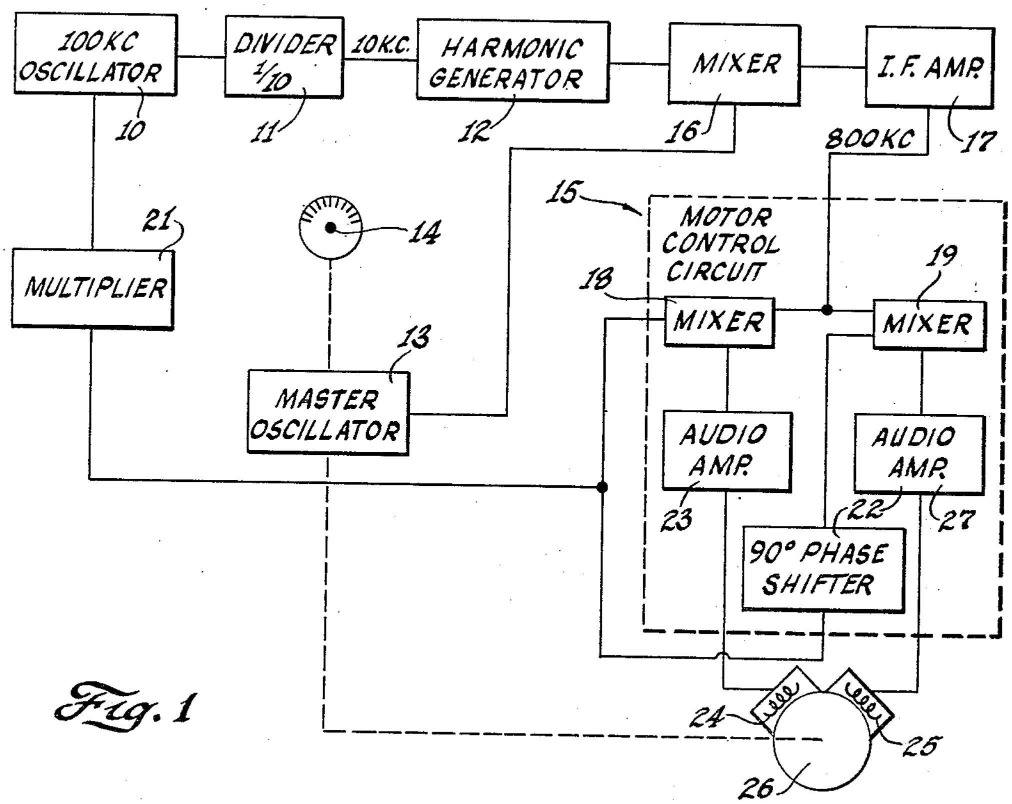
Figure 1 is a block diagram of the automatic frequency control system of this invention.

For purposes of clarity, the frequency stabilizing system of Figure 1 will be described using illustrative frequencies. It is to be understood, of course, that these frequencies are used only as examples in order to make the explanation more lucid, and the invention is not to be limited to the particular frequencies used. A stable frequency source 10, as for example, a crystal oscillator, furnishes an output to a divider 11 which has a dividing factor of 10 to obtain an output of 10 kilocycles. A harmonic amplifier 12 receives the output of the divider 11 and produces a spectrum of frequencies which are harmonics of 10 kilocycles.

A master oscillator 13 is step-tunable between two to four megacycles in ten kilocycle steps. It is this oscillator which is to be frequency controlled. A manual control dial 14 is connected to the oscillator 13 to step-tune it and the setting of the dial 14 controls the output frequency of the oscillator. It is assumed that the oscillator 13 may be tuned by the dial 14 to within four kilocycles of the desired output. A mixer 16 receives an output from the harmonic amplifier 12 and the oscillator 13. An intermediate frequency amplifier 17 receives the output of mixer 16 and is tuned to a narrow pass-band centered at 800 kilocycles. The output of the oscillator 13 will mix with all of the spectrum lines from the harmonic generator 12, but only one of the mixed outputs will fall within the range of the amplifier 17. The output of the amplifier 17 will therefore be 800 kilocycles plus the error, if any, of the oscillator 13. For example, if it is desired to tune the oscillator 13 to two megacycles and the dial 14 is set at this point, the output of the amplifier would be 800 kilocycles obtained from a mixture of the 1.2 megacycles frequency from harmonic generator 12 and the two megacycles from oscillator 13. Suppose that there existed a one kilocycle error in the output of the oscillator 13, then 2.001 megacycles would mix with the 1.200 megacycles from the generator 12 and the output of amplifier 17 would be 801 kilocycles.

A second mixer 18 and a third mixer 19 receive an output from amplifier 17. A multiplier 21 receives an output from the crystal oscillator 10 and multiplies it by eight to obtain an 800 kilocycle output. The mixer 18 receives an output from the multiplier 21 and a 90 degree phase-shifter 22 also receives an output from the multiplier 21. The mixer 19 receives the output of the phase shifter 22. The output of mixer 18 is furnished to an amplifier 23 which is connected to one phase 24 of a two phase motor 26. The mixer 19 supplies an output to amplifier 27 which is connected to the second phase winding 25, of motor 26.

Mixers 18 and 19 give an audio output with a frequency equal to the difference between 800 kilocycles obtained from the multiplier 21 and the signal from the amplifier 17. If no error exists in the output of oscillator 13, the amplifier 17 gives an 800 kilocycle output and there is no audio signal from the mixers 18 and 19. Any error present in the output of oscillator 13 produces an audio signal in the outputs of mixers 18 and 19 and the motor 26, which is mechanically linked to a tuning control on the oscillator 13, runs until the audio signal disappears. The motor 26 may be a two-phase hysteresis induction motor.

The mixers 18 and 19, amplifiers 23 and 27, and phase shifter 22 comprise a motor control circuit designated generally as 15.

Figure 2:
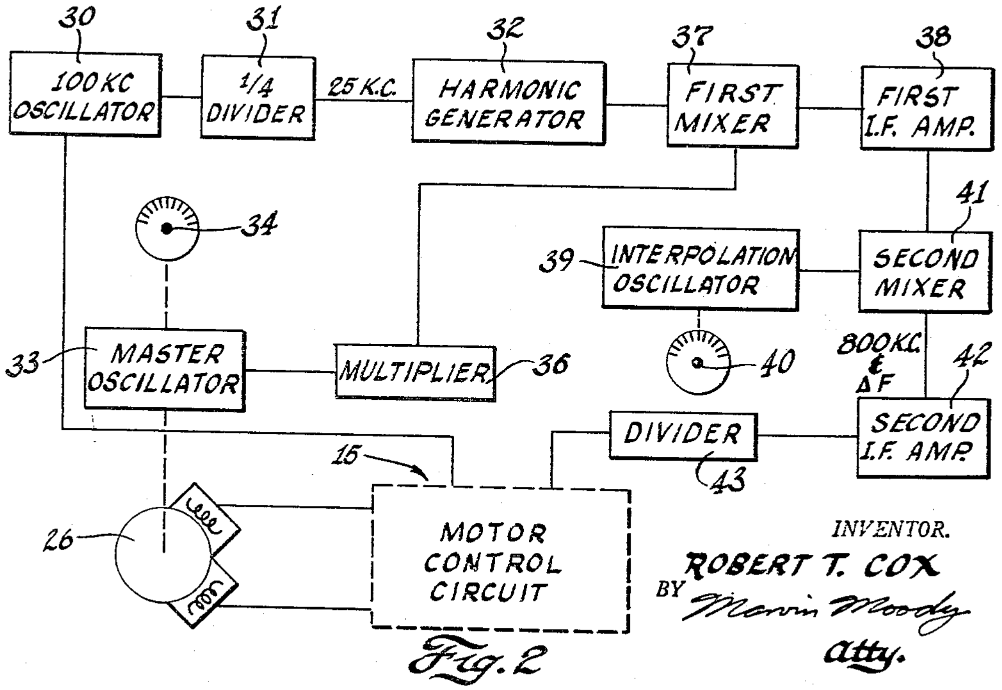
Figure 2 is a block diagram of a modification of this invention which has an interpolation feature incorporated therein.

The apparatus of Figure 1 provides means for obtaining frequency stability of a master oscillator which is step-tunable in fixed increments. The apparatus of Figure 2 is a modification of Figure 1 wherein a tunable oscillator may be maintained at a stable frequency at any point. A frequency standard as, for example, a 100 kilocycle crystal 30, furnishes an output to divider 31 which divides the input by four to obtain an output of 25 kilocycles. A harmonic generator 32 receives the output of the divider 31 and produces a spectrum of frequencies at 25 kilocycle points. A master oscillator 33 is tunable by the dial 34 and may be tuned from 1.0 to 1.5 megacycles. A multiplier 36 receives the output of the oscillator 33 and multiplies it by ten to obtain an output between ten and fifteen megacycles.

A first mixer 37 receives the output of the multiplier 36 and the output from harmonic generator 32. A first intermediate frequency amplifier 38 receives the output of the mixer 37 and passes frequencies between 875 and 900 kilocycles.

An interpolation oscillator 39 may be adjusted by a dial 40 to give an output frequency between 75 to 100 kilocycles. The dial 40 is calibrated from 0 to 2500. When the dial 40 is set at 0 an output of 75 kilocycles is obtained. If the dial is set at 1816, an output of 93.16 kilocycles will be obtained by adding 75+18.16. A second mixer 41 receives an input from the oscillator 39 and the amplifier 38. A second intermediate frequency amplifier 42 receives the output from the mixer 41 and amplifies a narrow band centered at 800 kilocycles. The pass-band of the amplifier 42 is broad enough only to pass 800 kilocycles plus any error. A divider 43 receives the output of the amplifier 42 and divides it by eight to obtain an output of 100 kilocycles plus an error signal.

The output of the divider 43 and a 100 kilocycle output from the frequency standard 30 are supplied to a motor control circuit designated generally as 15. The circuit 15 is similar in all respects to the motor control circuit described with reference to Figure 1 and will not be described in detail herein. The motor 26 is mechanically linked to the oscillator 33 to vary its frequency and the error signal present in the output of the divider 43 results in the motor 26 changing the output of oscillator 33 until the error is eliminated.

An example will be given to illustrate how the apparatus of Figure 2 operates.

Suppose that the oscillator 33 is accurately tuned to a frequency of 1.315632 megacycles, a frequency which is desired for operation. The output of multiplier 36 will be 13.15632 megacycles which will mix with an output of the generator 32 of 12.275 megacycles to obtain a first intermediate frequency out of the amplifier 38 of 881.32. The interpolation oscillator would be tuned to 632 (the last three digits of the desired frequency) and the output of interpolation oscillator would be 75+6.32 kilocycles or 81.32 kilocycles. This would be mixed in the second mixer 41 with the first intermediate frequency signal of 881.32. The output of the second mixer 41 would be 800 kilocycles plus any error present in the signal. Since it has been assumed that the master oscillator was on frequency, no error would be present and the output of the second mixer would be exactly 800 kilocycles. The motor 26 would not run, therefore, because there is no unbalance.

Figure 3:
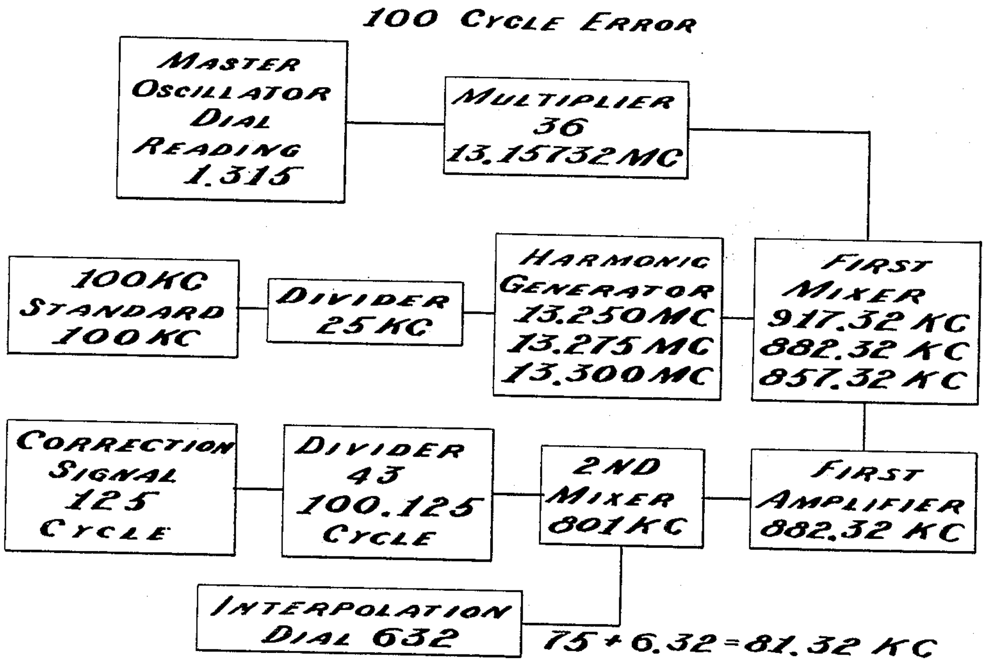
Figure 3 is an example of a 100 cycle error.
Figure 4:
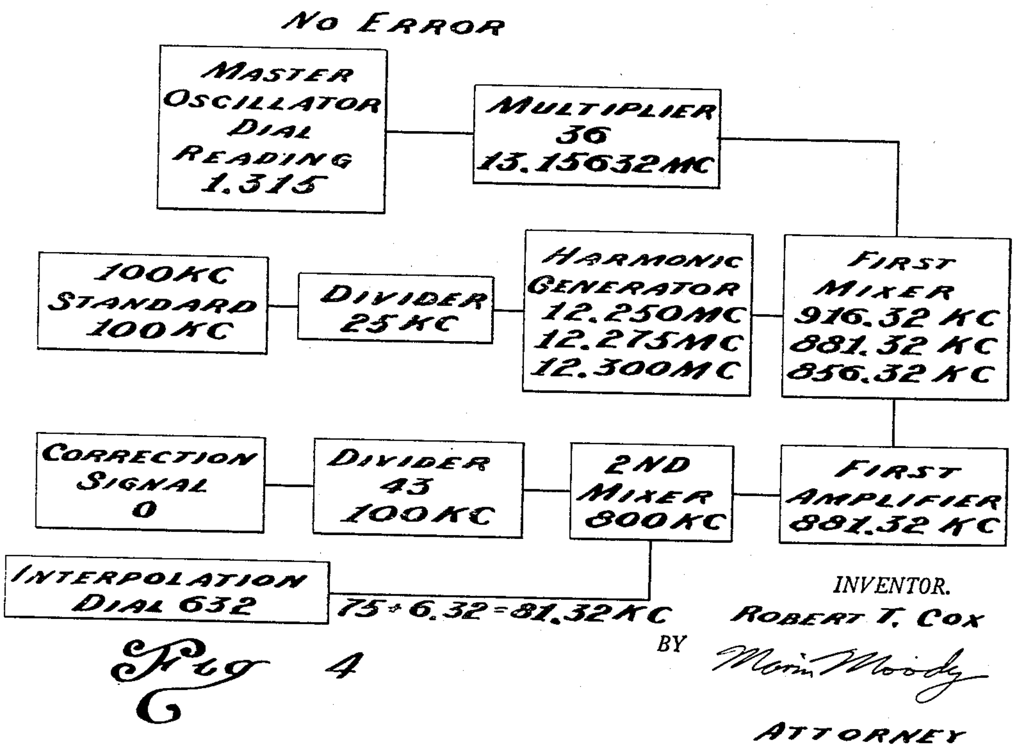
Figure 4 is an example of no error.

Suppose that the master oscillator in the above example had been off 100 cycles, it would mean that it was giving an output of 1.315732 instead of 1.315632. The output of multiplier 36 would then be 13.15732. The output of multiplier 36 would mix with the 12.275 megacycle spectrum point to obtain an intermediate frequency from the mixer 37 of 882.32 kilocycles. The interpolation oscillator would be set to the same point as in the previous example, or 632, to give an output of 81.32 kilocycles. The 81.32 kilocycles from the interpolation oscillator 39 would mix with the first intermediate frequency 882.32 to give an output of 801 kilocycles. The divider 43 would divide this by eight to give an output of 100.125 kilocycles which is supplied to the motor control circuit. The input of 100.125 kilocycles is compared with the 100 kilocycles from the oscillator 30 to give a motor actuating signal proportional to 125 cycles. The motor will run until the error is eliminated, which means that the master oscillator will be changed from a frequency of 1.131732 to a frequency of 1.315632. Figures 3 and 4 illustrate the above examples.

It is assumed that the master oscillator 33 may be tuned to within 2.5 kilocycles of the desired frequency by manual adjustment. This requirement is easily met with oscillators available today.

It is seen that this invention provides an automatic frequency control system which utilizes a two phase motor for bringing a master oscillator on to and maintaining it at a predetermined frequency.

Although it has been described with respect to particular embodiments thereof, it is not to be so limited as changes and modifications may be made therein which are within the full intended scope of the invention as defined by the appended claims.

I claim:

1. An automatic frequency control system for controlling a master oscillator comprising, a frequency standard, a harmonic generator receiving an output from said frequency standard and producing a plurality of harmonics of said standard, a first mixer receiving the output of said harmonic generator and an input from said master oscillator, filtering means receiving the output of said first mixer and passing only one frequency, 90 degree phase shifting means receiving an input from said frequency standard, second and third mixing means receiving inputs from said filtering means, said second mixing means receiving an input from said frequency standard, said third mixing means receiving an output from said phase shifting means, a two phase motor with one phase receiving the output of said second mixer and the second phase receiving the output of said third mixer, and coupling means connecting said motor to frequency control means on said master oscillator.

2. Means for varying the frequency of a master oscillator comprising, a standard frequency source, a harmonic generator receiving the output of said standard frequency source to obtain a plurality of harmonics, a mixer receiving an input from said harmonic generator and an input from said master oscillator, an intermediate-frequency filtering means receiving the output of said mixer to filter out all except one of said mixed signals, a motor control circuit comprising a second and third mixer which receive an input from said filtering means, a phase shifter receiving an input from said frequency standard, said second mixer receiving an input from said frequency standard, said third mixer receiving an input from said phase shifter, a two phase motor receiving an input from said second mixer on one phase thereof and an input from said third mixer on the other phase, and a mechanical linkage connecting said motor to said master oscillator to vary its frequency until no error is present in its output.

3. Means for controlling the frequency of a master oscillator comprising, a frequency standard, a harmonic generator receiving an output from said frequency standard, a first mixer receiving an output from a master oscillator and an output from a harmonic generator, a first filter means receiving the output of said first mixer and passing one of the mixed signals, an interpolation oscillator tunable over a frequency equal to the range between adjoining outputs of said harmonic generator, a second mixer receiving the output of said interpolation oscillator and the output of said first filtering means, second filtering means receiving the output of said second mixer and passing one frequency, third and fourth mixers receiving an output from said second filtering means, said third mixer receiving an output from said frequency standard, a 90 degree phase shifter receiving an output from said frequency standard, said fourth mixer receiving an output from said phase shifter, a two phase motor with one phase receiving an output from said third mixer and the other phase receiving an output from said fourth mixer, and said motor mechanically linked to frequency controlling means on said master oscillator.

4. Means for tuning and maintaining a master oscillator at a predetermined frequency comprising, multiplying means receiving the output of said master oscillator, a first mixer receiving the output of said multiplier, a harmonic generator producing a plurality of frequencies spaced equally distant apart and supplying an output to said first mixer, first filtering means receiving the output of said first mixer and passing one frequency, an interpolation oscillator tunable over a frequency range equal to the frequency between adjoining spectrum points of said harmonic generator, a second mixer receiving the output of said first filtering means and said interpolation oscillator, second filtering means receiving the output of said second mixer and passing one frequency, a frequency standard, a motor control circuit receiving an output from said frequency standard and the output of said filtering means to compare them and give an audio output equal to the frequency difference between said signals, driving means mechanically linked to frequency adjusting means on the master oscillator and receiving the output of said motor control circuit to change the frequency until the audio output of said control circuit is zero.

5. Means for controlling the frequency of a master oscillator comprising, a frequency standard, a harmonic generator receiving the output of said frequency standard and producing a plurality of harmonics thereof, a first mixer receiving the output of said harmonic generator and the output of said master oscillator, first filtering means receiving the output of said first mixer and band-passing an output over a band equal to the output of said frequency standard, an interpolation oscillator tunable over a frequency range equal to the output of said frequency standard, second mixing means receiving the output of said first filtering means and said interpolation oscillator, second filtering means receiving the output of said second mixer and tuned to a center frequency equal to the output of the frequency standard, a motor control circuit receiving the outputs of said second filtering means and said frequency standard to compare them and give an audio output equal to their frequency difference, and driving means receiving the output of said motor control circuit and mechanically connected to said master oscillator to adjust its frequency until the audio output of said motor control circuit is zero.

References Cited in the file of this patent

UNITED STATES PATENTS

| Number | Name | Date |
|---|---|---|
| 2,450,019 | Ranger | Sept. 28, 1948 |
| 2,452,601 | Ranger | Nov. 2, 1948 |
| 2,474,278 | Ranger | June 28, 1949 |
| 2,479,817 | Curran | Aug. 23, 1949 |
| 2,543,058 | Ranger | Feb. 27, 1951 |